United States Patent
Hong

[15] 3,692,355
[45] Sept. 19, 1972

[54] AUTOMOTIVE VISOR

[72] Inventor: Soon Pil Hong, 1138 S. Ardmore Ave., Los Angeles, Calif. 90006

[22] Filed: Sept. 24, 1970

[21] Appl. No.: 75,187

[30] Foreign Application Priority Data
Apr. 8, 1970  Republic of Korea..........1653

[52] U.S. Cl............296/97 G, 160/DIG. 3, 296/97 H
[51] Int. Cl. ...............................................B60j 3/02
[58] Field of Search .......296/97 R, 97 C, 97 F, 97 G, 296/97 H; 160/180, DIG. 3; 350/276 R; 40/67, 102

[56] References Cited

UNITED STATES PATENTS

| | | | |
|---|---|---|---|
| 3,445,135 | 5/1969 | Masi | 296/97 C |
| 2,239,158 | 4/1941 | McCloud | 296/97 F |
| 3,333,886 | 8/1967 | Wenger | 296/97 R |
| 2,715,043 | 8/1955 | Schewel | 350/276 R X |
| 1,982,511 | 11/1934 | Geist | 296/97 H |
| 2,118,198 | 5/1938 | Hathaway | 296/97 G |
| 2,673,118 | 3/1954 | Phelps | 296/97 K |
| 2,605,133 | 7/1952 | Newton | 296/97 F |
| 2,863,697 | 12/1958 | Watkins | 296/97 F |

FOREIGN PATENTS OR APPLICATIONS

| | | | |
|---|---|---|---|
| 1,305,142 | 8/1962 | France | 296/97 K |
| 143,329 | 12/1953 | Sweden | 296/97 K |

*Primary Examiner*—Kenneth H. Betts
*Assistant Examiner*—Leslie J. Paperner
*Attorney*—Fryer, Tjensvold, Feix, Phillips & Lempio

[57] ABSTRACT

A visor for use in automobiles to block out deleterious light rays is provided. The visor is of two-piece construction, forming left and right hand portions or shields of plastic material. The right hand shield has a horizontally oriented variation of coloration providing varying degrees of light transmission or translucency. The left hand portion has a similar variation in coloration in a combined horizontal and vertical arrangement. The left and right hand portions are selectively rotatable out of the driver's line of vision so that the entire visor may be used for daytime use while the right hand portion may be rotated up and out of the line of vision for night time use. A tab on the right hand shield facilitates coincident movement of both shields.

11 Claims, 9 Drawing Figures

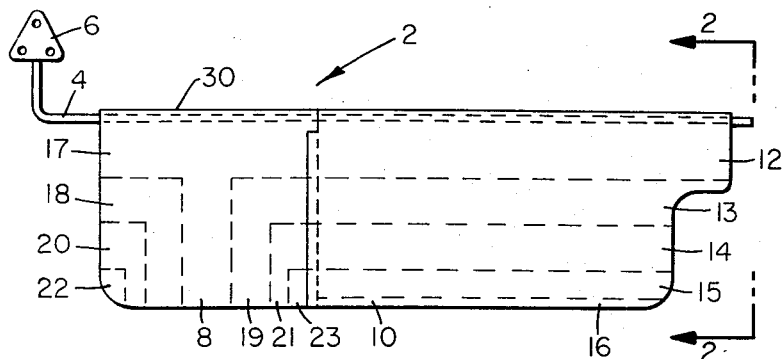
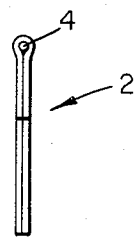
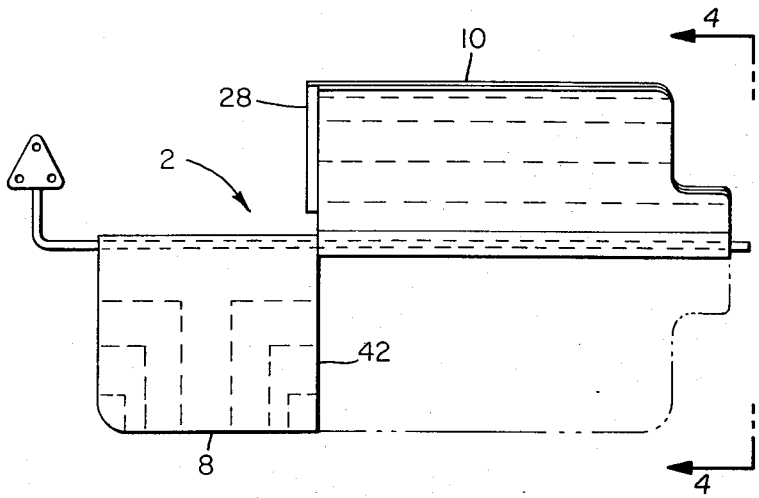
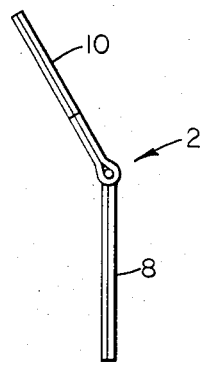
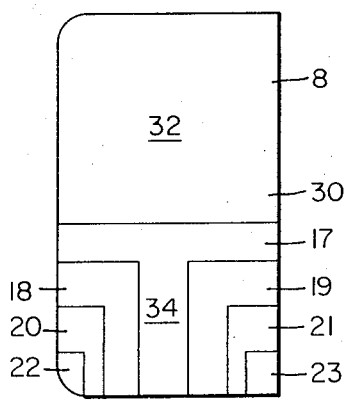
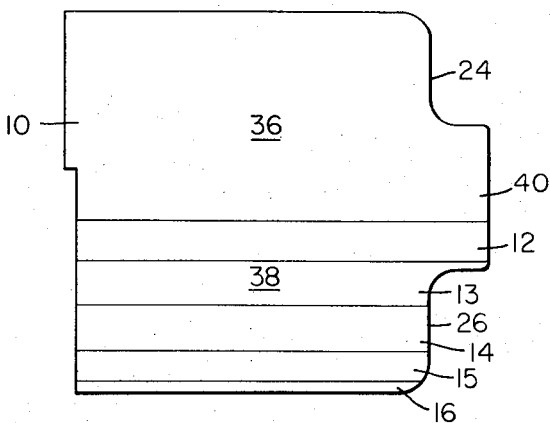
INVENTOR.
SOON PIL HONG
BY Fryer, Tjensvold, Feix, Phillips & Lempio
ATTORNEYS

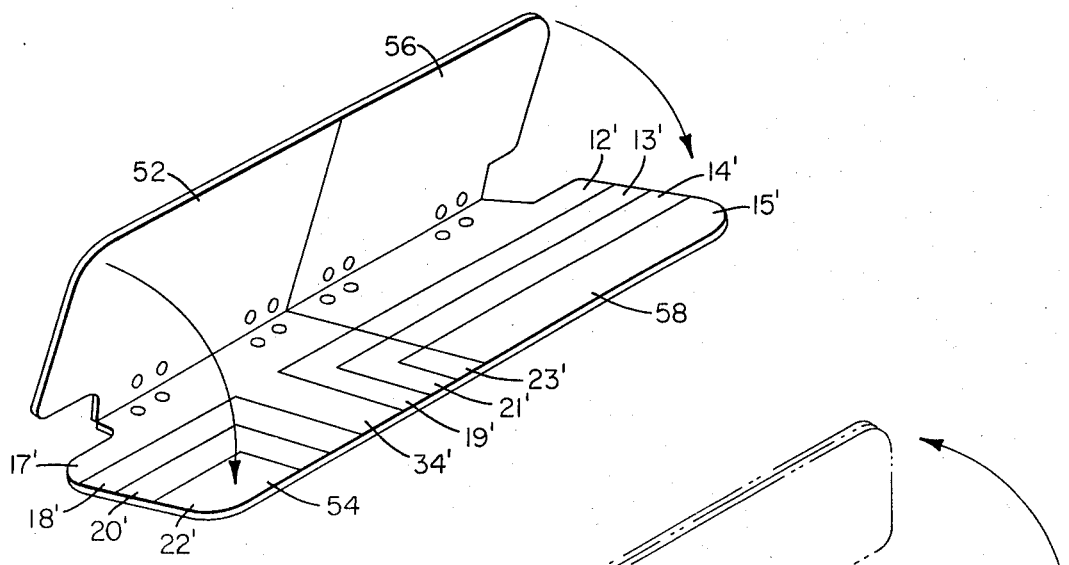
FIG_8
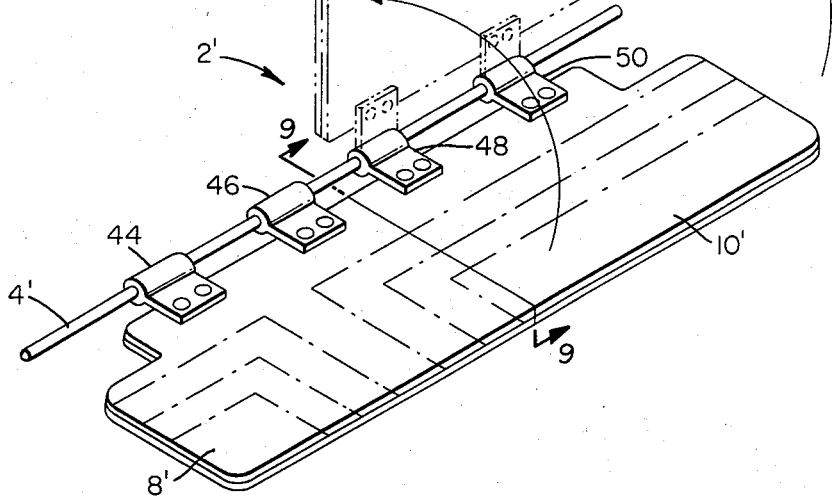
FIG_7
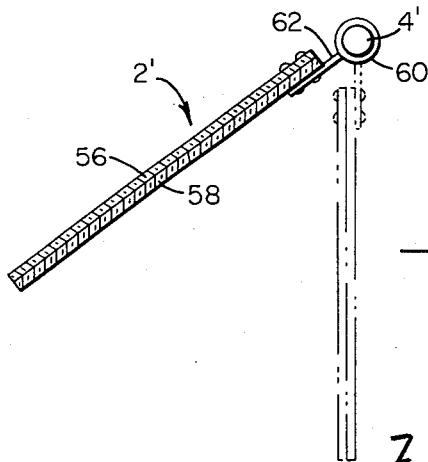
FIG_9
INVENTOR.
SOON PIL HONG
BY
Fryer, Tjensvold, Feix, Phillips & Lempio
ATTORNEYS

3,692,355

AUTOMOTIVE VISOR

BACKGROUND AND SUMMARY OF THE INVENTION

This invention is directed to a glare visor which is used in an automobile. More particularly, this invention is directed to an automotive visor which is designed to provide a driver with a means for filtering out deleterious light rays during either daytime or nighttime driving.

This invention takes the form of a generally rectangular structure comprising a pair of rotatable plastic shields which are movably mounted along one of their length edges to a support rod or shaft. The support rod is, in turn, adapted to be fixed at one end to a car interior in the conventional manner.

Currently, most automobiles in use have an opaque sun visor installed so as to be rotatable vertically downward from its non-use position parallel to the plane of the automobile roof to a position partially obstructing the glaring light rays that might otherwise deleteriously affect the driver's vision. These conventional sun visors have a number of drawbacks. First of all, as their name implies, they are useable only during daytime driving to moderate the direct or reflected rays of the sun. Accordingly, they are of no help for a great deal of the automobile travel which is done after dark.

Secondly, since they are opaque, these visors cut off 100 per cent of the light rays which they intercept. Thus, the driver's vision is impaired to the extent that he cannot see objects which are obscured by the visor. This, of course, is very dangerous from the standpoint of driving safety.

In an attempt to overcome these and other deficiencies, sun visors have been made of transparent plastic which are colored so as to filter out only a part of the light rays which would otherwise be seen by the driver. These visors typically are made of a colored, transparent plastic and have a homogenous translucence over their entire surface. This latter characteristic makes these visors unsuitable for both day and nighttime use since the brighter light rays encountered during daytime driving require greater filtration while the less bright rays encountered during nighttime driving require a lesser degree of filtration. In addition, the variation in light strength during the course of a given day results in the fixed light filtration capability of the visor providing the proper degree of filtration during only a small portion of the day. This is obviously the case since it is necessary to select a single, fixed degree of filtration when manufacturing the visor.

The problem is thus posed of providing an automotive visor which is effectual in light conditions encountered in both daytime and nighttime driving. It is also a problem to provide such a visor which is capable of variable light transmission to match the variable light conditions found in normal driving.

It is to a solution of the above-outlined problems that this invention is directed. The solution takes the form of a two-piece visor of transparent plastic having a geometric variation in coloration or translucence which provides variably adjustable light transmission.

It is therefore an object of this invention to provide an automotive visor which enhances driver convenience during either day or nighttime travel by filtering out direct or reflected rays of the sun or the light rays of headlights from oncoming cars.

It is also an object of this invention to provide an automotive visor of transparent plastic having two-piece construction wherein a portion of the visor may be rotated out of the line of vision during nighttime use.

It is also an object of this invention to provide an automotive visor which has a variation in translucency over its surface such as to be variably adjustable to accommodate different light conditions.

It is a further object of this invention to provide an automotive visor which has a particular orientation of color bands or zones to filter out deleterious light rays.

It is a still further object of this invention to provide an automotive visor of two-piece construction having a particular orientation of color bands or zones thereon in the form of horizontal and combined horizontal and vertical bands or zones.

It is a still further object of this invention to provide an automotive visor having a unique means of attachment between its shields and support means.

It is a still further object of this invention to provide a two-piece automotive visor having unique tab means which facilitates the coincident movement of the two pieces.

BRIEF DESCRIPTION OF THE DRAWING

FIG. 1 is an elevation view of the automotive visor embodying the invention in the vertically downward position for daytime use.

FIG. 2 is a side elevation view taken along the lines 2—2 of FIG. 1.

FIG. 3 is an elevation view of the automotive visor with the right hand sheet rotated up and out of the driver's line of vision for nighttime use.

FIG. 4 is a side elevation view taken along lines 4—4 of FIG. 1.

FIG. 5 is the left hand sheet shown prior to attachment to the support rod.

FIG. 6 is the right hand sheet shown prior to attachment to the support rod.

FIG. 7 is an isometric view of an alternate embodiment of the automotive visor of this invention showing alternative means for attaching the plastic shields to the support rod.

FIG. 8 is an isometric view of the plastic sheets making up the shields of FIG. 7 shown before they are installed on the support rod.

FIG. 9 is a sectional view taken in direction 9—9 of FIG. 7 and showing the means of attachment of the plastic shields as well as a phantom line illustration of a rotated position of the visor.

DETAILED DESCRIPTION

Referring now to FIG. 1, there is shown generally at 2 an automotive visor assembly embodying the subject invention. The visor comprises an elongated, horizontal support rod or shaft 4 which is adapted to be fixed to an automobile interior by means of support bracket 6 having a plurality of mounting holes therein. Conventional mounting means such as screws or bolts may be used to fix the support rod into position.

Depending from the support rod 2 is a pair of transparent shields comprising left hand and right hand shields 8 and 10, respectively. These shields are conveniently made of transparent material such as clear plastic which has a variation in color or hue such as to provide a filter effect to deleterious light rays.

As may be seen in FIG. 1 variable filtration is provided by orienting a series of transparent, colored bands on the shields in a definite geometric pattern. Right hand shield 10 has a progressive series of horizontal color bands 12 through 16 thereon. Similarly, left hand shield 8 has a series of vertical as well as horizontal color bands numbered 17 through 23 thereon. The color bands on the left hand shield 8 may be conveniently thought of as being in the pattern of a series nesting "T's." The purpose of the particular orientation of color bands will be hereinafter described.

Turning now to FIGS. 5 and 6, there is shown the details of fabrication of the right and left hand shields 8 and 10, respectively. In FIG. 5 there is shown a generally rectangular sheet or plate of clear, transparent material such as, for example, clear plastic. The flat sheet of clear plastic is cut as shown and bands or zones 17-23 are colored in deepening shades or hues of a single color from darker at 17 to lighter at 22, 23. The intermediate bands are intermediately colored.

Similarly, at FIG. 6 is shown a generally rectangular sheet or plate which may be colored in deepening shades from darker at 12 to lighter at 15. Band 16 may be conveniently left clear to enhance vision. Relieved areas may be conveniently cut out at 24 and 26 and a projection or tab means may be left part way along the left hand edge at 28 for a purpose to be hereinafter described.

The coloration may be applied to the surface of the sheets by any convenient manner, e.g., by painting or spraying in deepening shades of transparent plastic paint. Alternatively, the coloration may be achieved by implanting pigment in the clear plastic. The applicant has found that the color blue is especially well suited to day and nighttime driving. Thus, zone 17 would be colored deep blue, zones 18, 19 a lighter blue, zones 20, 21 still lighter blue, and zones 22, 23 the lightest blue.

In terms of light transmission, applicant has found that the deepest color zone should transmit about 60 per cent of the visible light spectrum and that the variation for the other zone may be linearly proportional. Thus, the zone pairs 18, 19 may transmit 70 per cent, zone pairs 20, 21, 80 per cent, and zone pairs 22, 23, 90 per cent of the visible light spectrum. Similarly, the bands on shield 10 would vary from dark at 12 to light at 15, as best seen in FIG. 6.

While color zones have been described resulting in a step variation in the degree of filtration, it is contemplated that there may alternatively be a smooth transition from the darker to the lighter zones such that bands may not be discriminated by the eye. Thus, rather than having discrete bands or zones, there would be a truly linearly proportional variation from dark to light.

The visor assembly may be conveniently fabricated by folding over the shield 8, for example, around the support rod to form a wrap around structure as best seen in FIG. 2. This process may be accomplished by heating the plastic sheet until it is pliable and then folding it over the rod at its midpoint 30 until opposite sides or sheets 32, 34 of the shield are in contact substantially over their entire surface. The midpoint area is caused to plastically deform and closely conform to the rod shape. The contacting sides or sheets may be securely fastened together by using, e.g., a clear adhesive. Similarly, shield 10 may be formed by folding over opposite sides or sheets 36, 38 at midpoint 40. One advantage of this construction is that transparent sheets 32, 36 protectively cover the painted bands on sides 34, 38, respectively.

The operation of the visor is as follows. During daylight use, both shields 8 and 10 are manually rotated to the vertically downward position shown in FIG. 1. In this position, direct and reflected rays of the sun are filtered or moderated.

During nighttime use, as best seen in FIGS. 3 and 4, the right hand shield 10 is manually rotated to the position shown which is out of the line of vision. The left hand shield is thus the only shield in the operative position.

With either daytime or nighttime operation, the filtration effect can be controlled by manually adjusting the angle of the shields from the vertical. The shields are maintained in this or any other position by the friction forces engendered between the midpoint areas 30, 40 of the shields and the support rod 4.

Also a feature of the visor is the projection or tab means 28 which extends along the left hand edge of right hand shield 10. The projection cooperates with the right hand edge of contiguous left hand shield 8 such that manual downward rotation of shield 10 results in coincidental movement of shield 8. The placement of the tab means is such that the reverse rotation of shield 10 into the inoperative position, as seen in FIGS. 3, 4, does not cause movement of shield 8. Thus shield 8 remains in position until manually rotated out of the line of vision. It is contemplated that during normal driving conditions that neither shield be in the operative position.

The particular pattern of coloration of the visor embodied in the horizontal bands or zones of varying translucency allow the filtration or moderation of light rays originating at some distance in front of the automobile, e.g., the rays of the sun. The vertically oriented bands or zones are designed to filter or moderate light rays from sources which approach the driver from a lateral angle, e.g., the headlights of an oncoming car which passes to the driver's left. The result of the combination of vertical and horizontal color zones is the series of nesting "T's" shown in the figures.

Turning now to FIGS. 7-9, there is shown a second embodiment of the applicant's invention having structurally similar parts labeled with the numerical designation assigned to the first embodiment, and including the addition of primes.

FIG. 7 shows visor assembly 2' having right hand and left hand shields 8' and 10' rotatably fixed to rod 4' by means of a plurality of support brackets 44, 46, 48, 50. The shields may be constructed from a matching pair of sheets and are secured together by fastening means, e.g., rivets, which serve as attachment means for attaching the shields to the brackets. For example, as seen in FIG. 8, shields 8' and 10' are made up of sheets 52, 54 and 56, 58, respectively. Coloration is, of course, added to the surface of sheets 54 and 58 before the sheets are sandwiched together. As best seen in FIG. 9, each bracket is made up of a tubular member 60 having a generally rectangular projection 62 fixed to one side thereof.

What is claimed is:

1. An automotive visor comprising an elongated support rod having means thereon adapted for attachment to an automobile interior, a pair of transparent shields comprising a right-hand and a left-hand shield, each of said shields defining a length edge, means rotatably securing said shields to a support rod along each of said length edges such that said shields are contiguous along the support rod, and means providing said right and left hand shields with a variation in coloration ranging from dark to light across the shields whereby a variation in light filtration is produced, the orientation of the variation in coloration on the right hand shield being horizontal, and the orientation of the variation in coloration on the left hand shield being in the form of a first zone extending horizontally across the top edge portion of the shield as well as vertically from said top edge portion to the bottom edge portion in an area intermediate and spaced from the left and right edges of the shield, and wherein successive zones extend from said first zone on both the left and right sides of the vertically oriented portion of said first zone to the lower left and right corner portions of the shield.

2. The automotive visor of claim 1 wherein the means for securing the shields to the support rod comprise a plurality of support brackets rotatably connecting said shields with said rods.

3. The automotive visor of claim 1 wherein the shields are of plastic material and said means for securing the shields to the support rods comprise plastic material conforming to the shape of the support rod over substantially the entire circumference of the support rod and joined to the length edges of the shields.

4. The automotive visor of claim 1 wherein the variation in coloration is from dark blue to light blue.

5. The automotive visor of claim 1 further including a tab means on one of said shields so positioned with respect to the other of said shields as to enable coincident movement of said other shield when said one shield is moved.

6. The automotive visor of claim 5 wherein said tab means is a tab, said tab being located on a left hand edge of the right hand shield in a position to intercept a right hand edge of the left hand shield.

7. The automotive visor of claim 1 wherein each of said shields comprises a pair of sheets of transparent material which are in contact over substantially their entire area.

8. The automotive visor of claim 5 wherein the means providing a variation in coloration comprise transparent paint applied to one of the sheets comprising each shield pair.

9. The automotive visor of claim 8 wherein the variation in coloration is linearly proportional from dark to light thereby producing linearly proportional light filtration across the shields.

10. The automotive visor of claim 8 where in the coloration is applied in bands, thus producing a step variation in light filtration across the shields.

11. The automotive visor of claim 10 wherein the number of bands is four and the first of the bands transmits 60 per cent, the second 70 per cent, the third 80 per cent and the fourth 90 per cent of the visible light spectrum incident thereon.

* * * * *